(12) United States Patent
Kamandahalli et al.

(10) Patent No.: US 12,421,461 B2
(45) Date of Patent: Sep. 23, 2025

(54) SYSTEMS AND METHODS TO USE WASTE HEAT FOR COOLING IN A GAS OIL SEPARATION PLANT

(71) Applicant: Saudi Arabian Oil Company, Dhahran (SA)

(72) Inventors: Srinivasaiah Kamandahalli, Abqaiq (SA); Kamarul Ariffin Amminudin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 498 days.

(21) Appl. No.: 17/898,094

(22) Filed: Aug. 29, 2022

(65) Prior Publication Data

US 2024/0067888 A1    Feb. 29, 2024

(51) Int. Cl.
| | |
|---|---|
| *C10G 33/06* | (2006.01) |
| *B01D 17/02* | (2006.01) |
| *B01D 17/04* | (2006.01) |
| *B01D 17/12* | (2006.01) |
| *B01D 19/00* | (2006.01) |
| *C10G 31/06* | (2006.01) |

(52) U.S. Cl.
CPC ......... *C10G 33/06* (2013.01); *B01D 17/0202* (2013.01); *B01D 17/042* (2013.01); *B01D 17/12* (2013.01); *B01D 19/0005* (2013.01); *C10G 31/06* (2013.01)

(58) Field of Classification Search
CPC .... C10G 33/06; C10G 31/06; B01D 17/0202; B01D 17/042; B01D 17/12; B01D 19/0005; B01D 53/1425; B01D 53/263; B01D 53/265; F01K 23/10; F01K 7/44; F01K 7/22; F01K 17/02; F01K 25/08; F01K 7/40; F01K 9/02; F22B 1/1815; F22B 35/06; F25B 13/00; F25B 2309/06; F25B 27/02; F25B 40/02; F28D 2021/0071
USPC .... 96/242, 136, 184, 234; 60/39.182, 39.83, 60/691, 693; 165/181; 210/170.01; 237/12.1; 63/236, 324.1, 468, 470, 473, 63/476, 509, 515, 56; 95/161, 163, 250, 95/253, 254, 256, 94
See application file for complete search history.

(56) References Cited

U.S. PATENT DOCUMENTS

| | | | |
|---|---|---|---|
| 2,565,943 | A | 8/1951 | Berestneff |
| 3,464,221 | A | 9/1969 | Stierlin et al. |
| 6,640,559 | B1 | 11/2003 | McQuade et al. |
| 9,851,153 | B2 | 12/2017 | Noureldin et al. |
| 2018/0002623 | A1* | 1/2018 | Noekleby .......... B01D 19/0036 |
| 2019/0194554 | A1 | 6/2019 | Soliman et al. |

OTHER PUBLICATIONS

SAIP Examination Report in SAIP Appln. No. 123450242, dated Aug. 19, 2024, 10 pages, with English Translation.
johnsoncontrols.com [online], "Application opportunities for absorption chillers," York by Johnson Controls, 2008, retrieved from URL <https://www.johnsoncontrols.com/~/media/jci/be/united-states/hvac-equipment/chillers/files/be_ypc_res_absorption-guide.pdf?la=en>, 20 pages.

* cited by examiner

*Primary Examiner* — Qianping He
(74) *Attorney, Agent, or Firm* — Fish & Richardson P.C.

(57) ABSTRACT

The disclosure relates to systems and methods for using waste heat to increase crude yield, reduce an amount of water in hydrocarbon products and enhance pipeline integrity in a gas oil separation plant.

7 Claims, 6 Drawing Sheets

SYSTEMS AND METHODS TO USE WASTE HEAT FOR COOLING IN A GAS OIL SEPARATION PLANT

FIELD

The disclosure relates to systems and methods for using waste heat to increase crude yield, reduce an amount of water in hydrocarbon products and enhance pipeline integrity in a gas oil separation plant (GOSP).

BACKGROUND

Three-phase crude is typically transported from producing wells to GOSPs where fluids are separated in high-pressure production traps (HPPT) and low-pressure production traps (LPPT).

FIG. 1 schematically depicts a system 1000, which is a portion of a GOSP. In the system 1000, fluid containing gas, oil, including condensable hydrocarbons (e.g., butane, pentane, hexane and heavier hydrocarbons), and water from a HPPT and/or a LPPT 1050 is sent to a high-pressure compressor 1100, which compresses the fluid. The compressed fluid is sent to the reheater 1200 where it heat exchanges with separated gas from a separator 1400 to remove heat from the fluid and heat the separated gas. The fluid exits the reheater 1200 and is sent to a fin fan cooler 1300, which removes heat from the fluid. The cooled fluid is sent to a separator 1400, which separates gas from the fluid which is returned to the reheater 1200 and oil from the fluid that goes to a crude oil line 1450. The separated gas from the separator 1400 sent to the reheater 1200, is heated in the reheater 1200 then sent as a gas stream to the gas plant 1250, where the gas is processed and contaminants are removed. The fluid in the crude oil line 1450 is often sent to a stabilization plant. Although not shown in FIG. 1, the separator 1400 can have an additional outlet to remove water separated from the fluid from the GOSP.

The water and/or condensable hydrocarbons the fluid can damage (e.g., corrode) components in the system 1000. In addition, condensation of the condensable hydrocarbons in the gas pipeline can lead to a reduction in crude yield.

SUMMARY

The disclosure relates to systems and methods for using waste heat to increase crude yield, reduce an amount of water in hydrocarbon products and enhance pipeline integrity in a GOSP. In particular, the systems and methods use vapor absorption machines, which can use low-grade waste heat from the GOSP to generate chilled water without the use of a compressor. The chilled water is used for cooling to condense condensable hydrocarbons and/or water from a fluid in the GOSP, enabling additional hydrocarbon recovery, a reduction in water in the hydrocarbon products, and/or reduced water condensation in pipelines. Hydrocarbons condensed using the chilled water generated by the vapor absorption machines can be injected back into the dehydrated crude product to increase the volume of crude produced and increase the value of crude by increasing the API gravity of the crude.

The systems and methods can improve pipeline integrity by reducing corrosion related to hydrocarbon and/or water condensation relative to other systems and methods. The systems and methods can also reduce time and/or costs associated with periodic scrapping activities relative to other systems and methods. The systems and methods can increase hydrocarbon recovery by reducing an amount of hydrocarbons collected in slug-catchers during scrapping, as well as reducing emissions associated with the combustion of hydrocarbons from slug-catchers released into cryogenic burn pits.

The systems and methods can remove condensable hydrocarbons and water with lower energy consumption and lower capital expenditure related to installation and operation costs relative to other systems and methods, such as cooling with refrigeration systems.

In a first aspect, the disclosure provides a system, including a vapor absorption machine and a GOSP. The vapor absorption machine includes a hot water generator and a chiller. The hot water generator includes an interior having a fluid disposed therein, and the chiller includes an interior having a fluid disposed therein. The GOSP includes a compressor, a reheater, a fin fan cooler, and a separator. The reheater includes a first inlet in fluid communication with an outlet of the compressor, a first outlet configured to remove a gas from the GOSP, a second inlet, and a second outlet. The fin fan cooler includes an inlet in fluid communication with the second outlet of the reheater, and an outlet. The separator includes an inlet in fluid communication with the outlet of the fin fan cooler, a first outlet in fluid communication with the second inlet of the reheater, and a second outlet configured to remove a condensate from the GOSP. The vapor absorption machine is configured to decrease a temperature of the fluid in the interior of the chiller using heat from the fluid in the interior of the hot water generator. A portion of the fluid in the interior of the hot water generator is in thermal communication with a portion of a fluid disposed between the outlet of the compressor and the first inlet of the reheater. The system is configured so that a temperature of the fluid in the interior of the hot water generator is increased using heat from the fluid in between the outlet of the compressor and the first inlet of the reheater. A portion of the fluid in the interior of the chiller is in thermal communication with a portion of a fluid disposed between the outlet of the fin fan cooler and the inlet of the separator. The system is configured so that the fluid in the interior of the chiller reduces a temperature of the fluid between the outlet of the fin fan cooler and the inlet of the separator.

In some embodiments, the hot water generator includes tubes, and the hot water generator is configured so that the fluid disposed in the hot water generator is circulated within the tubes.

In some embodiments, the chiller includes tubes, and the chiller is configured so that the fluid in the interior of the chiller is circulated within the tubes.

In some embodiments, the GOSP further includes at least one member selected from the group consisting of a high-pressure production trap and a low-pressure production trap, the member includes an outlet, and the compressor includes an inlet in fluid communication with the outlet of the member.

In some embodiments, the separator further includes a third outlet configured to remove water from the GOSP.

In some embodiments, the fluid between the outlet of the fin fan cooler and the inlet of the separator includes a condensable hydrocarbon, and the reduction in the temperature of the fluid between the outlet of the fin fan cooler and the inlet of the separator is sufficient to condense at least a portion of the condensable hydrocarbon in the fluid between the outlet of the fin fan cooler and the inlet of the separator.

In some embodiments, the fluid between the outlet of the fin fan cooler and the inlet of the separator includes water, and the reduction in the temperature of the fluid between the outlet of the fin fan cooler and the inlet of the separator is sufficient to condense at least a portion of the water in the fluid between the outlet of the fin fan cooler and the inlet of the separator.

In a second aspect, the disclosure provides a method, including: thermally contacting a portion of a fluid disposed in an interior of a hot water generator of a vapor absorption machine with a portion of a fluid disposed between an outlet of a compressor and an inlet of a reheater of a GOSP; thermally contacting a portion of a fluid disposed in an interior of a chiller of a vapor absorption machine with a portion of a fluid disposed between an outlet of a fin fan cooler and an inlet of a separator of the GOSP; increasing a temperature of the fluid disposed in the hot water generator using heat from the fluid disposed between the outlet of the compressor and the inlet of the reheater; and decreasing the temperature of the fluid disposed between the outlet of the fin fan cooler and the inlet of the separator with the fluid disposed in the chiller. The vapor absorption machine lowers a temperature of the fluid in the interior of the chiller using heat from the fluid in the interior of the hot water generator.

In certain embodiments, the fluid between the outlet of the fin fan cooler and the inlet of the separator includes a condensable hydrocarbon, and at least a portion of the condensable hydrocarbon condenses after thermal contact with the fluid in the interior of the chiller.

In certain embodiments, the GOSP further includes an outlet configured to remove a condensate from the GOSP, the outlet including an interior having a fluid disposed therein; and an amount condensable hydrocarbon in the fluid in the interior of the outlet configured to remove the condensate is increased relative to the absence of the vapor absorption machine.

In certain embodiments, the fluid between the outlet of the fin fan cooler and the inlet of the separator includes water; and at least a portion of the condensable hydrocarbon condenses after thermal contact with the fluid in the interior of the chiller.

In certain embodiments, the GOSP further includes an outlet configured to remove a gas from the GOSP, the outlet including an interior having a fluid disposed therein; and an amount of water in the fluid in the interior of the outlet configured to remove the gas is reduced relative to the absence of the vapor absorption machine.

In certain embodiments, amount of water in the fluid in the interior of the outlet configured to remove the gas is less than 0.5 mole percent (mol. %).

In certain embodiments, the amount of water in the fluid in the interior of the outlet configured to remove the gas is less than 0.4 mol. %.

In certain embodiments, the amount of water in the fluid in the interior of the outlet configured to remove the gas is less than 0.3 mol. %.

DETAILED DESCRIPTION

Figure 1:
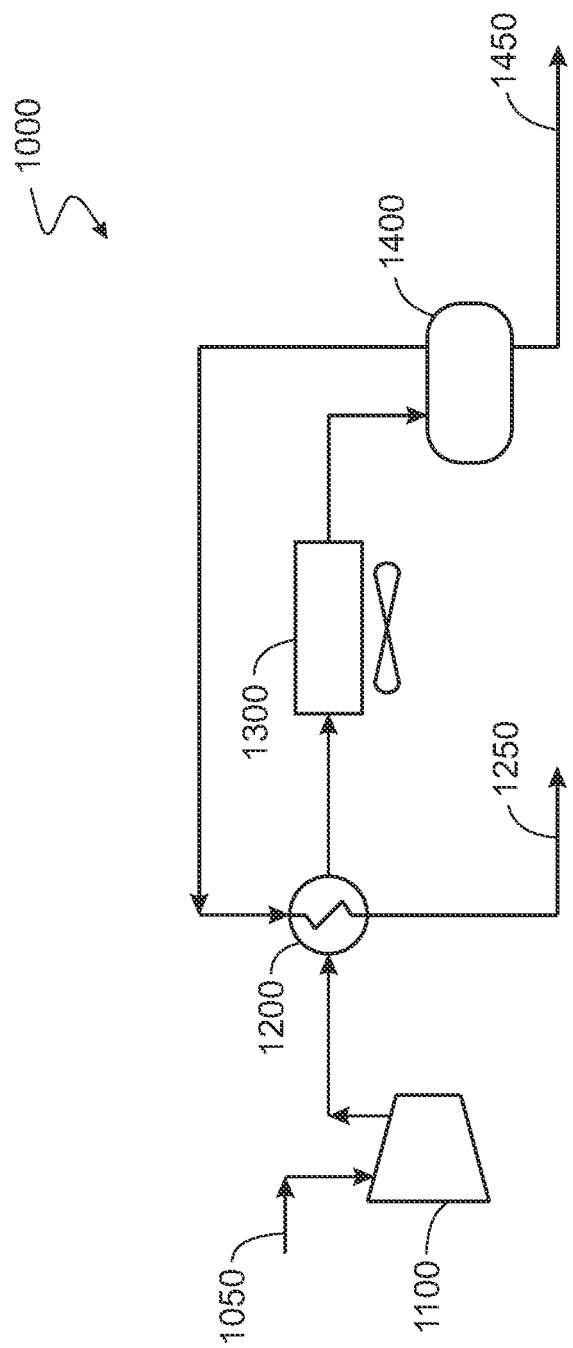
FIG. 1 schematically depicts a system.
Figure 2:
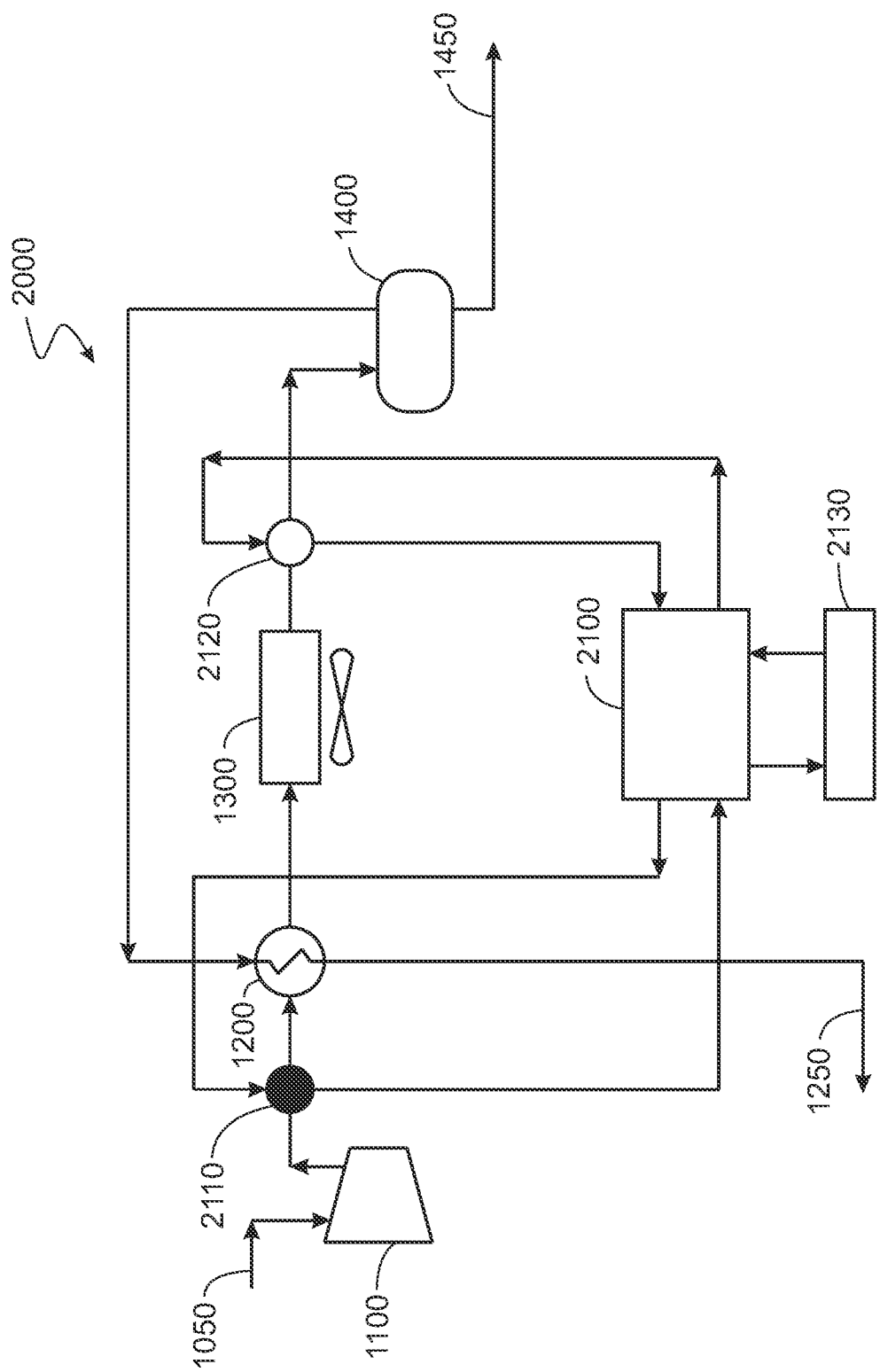
FIG. 2 schematically depicts a system.

FIG. 2 schematically depicts a system 2000. The system 2000 includes the components of the system 1000, as well as a vapor absorption machine 2100. The vapor absorption machine 2100 includes a hot water generator 2110, a chiller 2120 and a cooling tower 2130. The hot water generator 2110 is in thermal contact with the outlet of the compressor 1100 before the inlet of the reheater 1200. The hot water generator 2110 generates hot water using heat from a fluid in the outlet of the compressor 1100. Hot water from the hot water generator 2110 is used by the vapor absorption machine 2100 to generate chilled water for the chiller 2120. In the generator, the hot water flows through tubes immersed in a solution of refrigerant and absorbent. The solution absorbs heat from the hot water, causing the refrigerant to vaporize and separate from the absorbent solution. The refrigerant vapors enter the condenser of the vapor absorption machine 2100 and condense using cooling water from the cooling tower 2130. The condensed refrigerant flows through the expansion valve of the vapor absorption machine 2100 to the evaporator of vapor absorption machine 2100. The evaporator is at a lower pressure than the condenser causing the refrigerant to cool. The evaporator contains a bundle of tubes that carry the water to be chilled. The refrigerant absorbs heat from the circulating water and evaporates. The vaporized refrigerant is then absorbed by absorbent and then the concentrated absorbent enters the generator and the cycle continues.

Chilled water generated in the evaporator flows to the chiller 2120. The chiller 2120 is in thermal communication with the inlet of the separator 1400, after the outlet of the fin fan cooler 1300. The chiller 2120 cools a fluid in the inlet of the separator 1400, causing condensation of condensable hydrocarbons and water prior to separation in the separator 1400.

In some embodiments, the amount of water in the fluid sent to a gas processing plant 1250 is at least 0.001 (e.g., at least 0.005, at least 0.01, at least 0.02, at least 0.05, at least 0.1, at least 0.2, at least 0.3, at least 0.4, at least 0.5) mole percent (mol. %) and at most 1 (e.g., at most 0.9, at most 0.8, at most 0.7, at most 0.6, at most 0.5, at most 0.1, at most 0.05, at most 0.01) mol. %. In some embodiments, the amount of water in the fluid sent to the gas processing plant 1250 is reduced by at least 0.1 (e.g., at least 0.2, at least 0.3, at least 0.4, at least 0.5) mol. % and at most 1 (e.g., at most 0.9, at most 0.8, at most 0.7, at most 0.6, at most 0.5) mol. % relative to the absence of the vapor absorption machine 2100.

Other Embodiments

While certain embodiments have been disclosed above, the disclosure is not limited to such embodiments.

As an example, while embodiments have been disclosed that include using a fluid disposed in the outlet of the compressor 1100 as a heat source for the vapor absorption machine 2100, the disclosure is not limited to such embodiments. In some embodiments, additionally or alternatively, the fin fan cooler 1300 serves as the heat source for the vapor absorption machine and the hot water generator 2110 is in thermal contact with the fin fan cooler 1300.

Example

A steady state simulation model was conducted using HYSYS software to simulate gas compression and cooling in a GOSP.

Figure 3A:
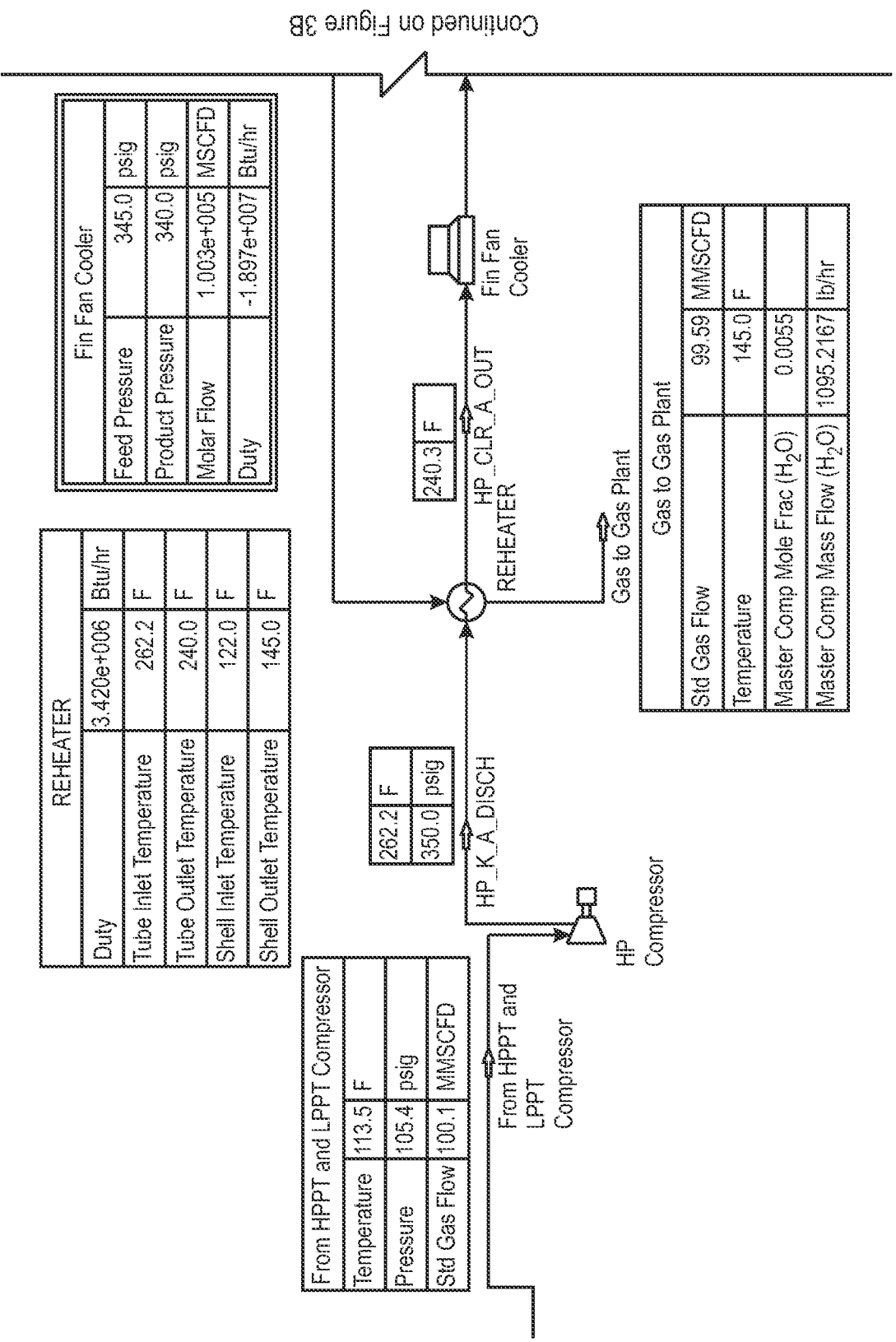
FIGS. 3A and 3B schematically depict a system and results of a process simulation for the system.
Figure 3B:
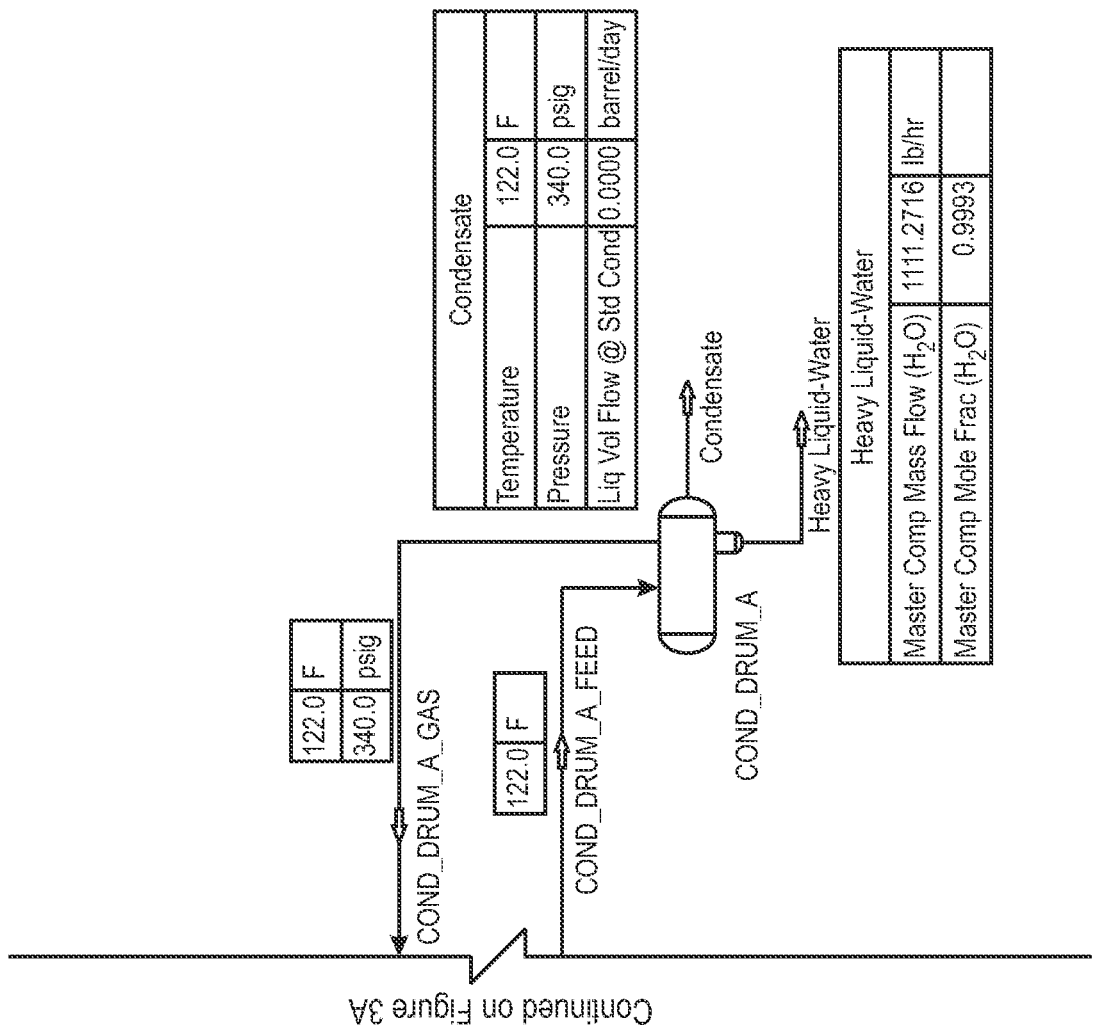

FIGS. 3A and 3B show simulation results of a hydrocarbon compression and cooling system using fin fan coolers. For the simulations, the feed gas to the HP compressor had a flow rate of 100 million standard cubic feet per day (MMSCFD), a pressure of 105.4 pound per square inch (psig) and a temperature of 113.5° F.; the HP gas compressor discharge pressure was 350 psig; the fin fan cooler inlet temperature was 240° F. and the outlet temperature was 122° F.; the gas stream to the gas plant had a temperature of 145° F. and a pressure of 340 psig; and the thermodynamic model used was the Peng-Robinson equation of state.

From the simulation, the amount of water present in the gas exiting from GOSP was 0.55 mol. % and the quantity of hydrocarbons condensed by using fin fan coolers was zero.

Figure 4A:
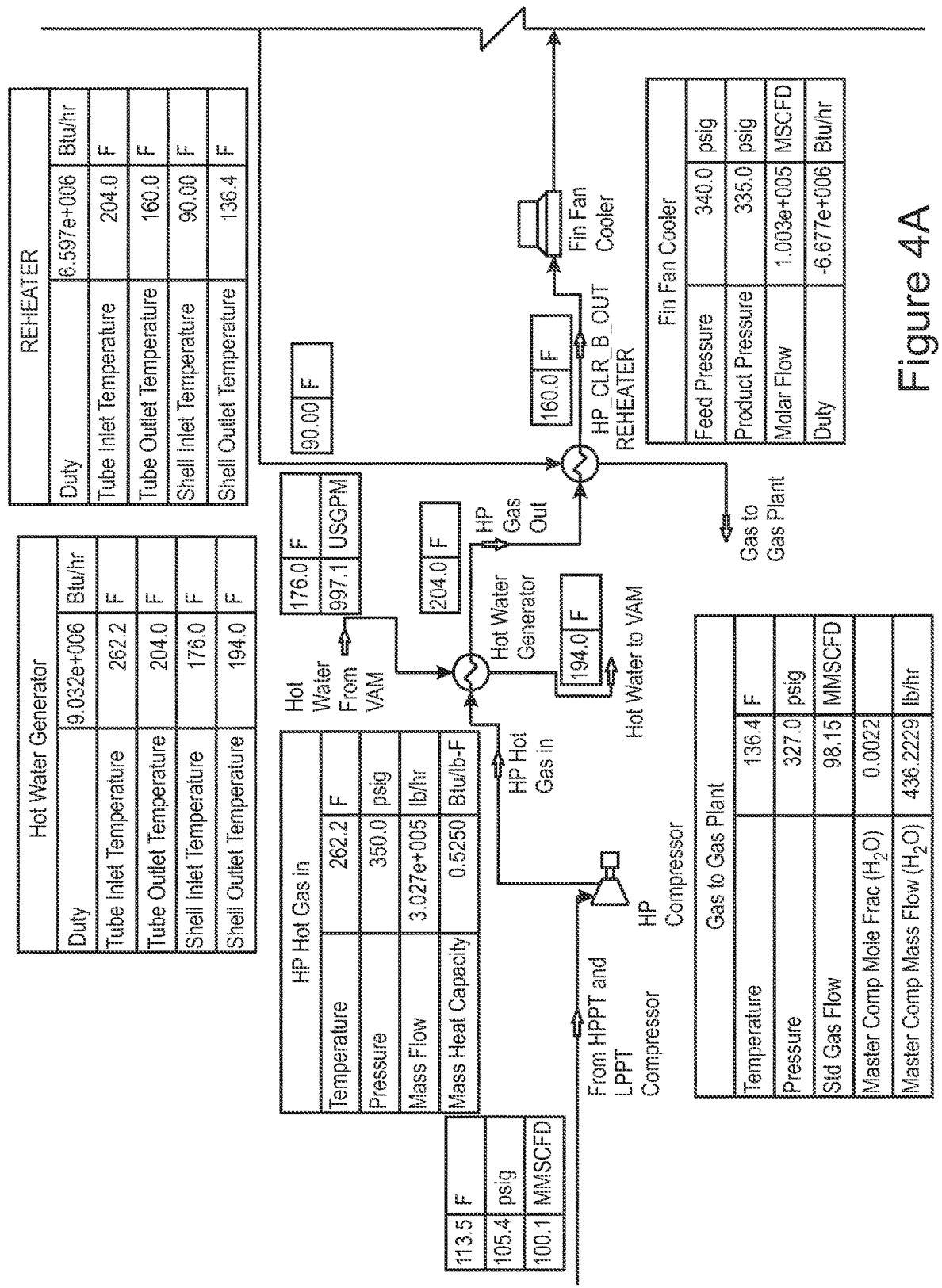
FIGS. 4A and 4B schematically depict a system and results of a process simulation for the system.
Figure 4B:
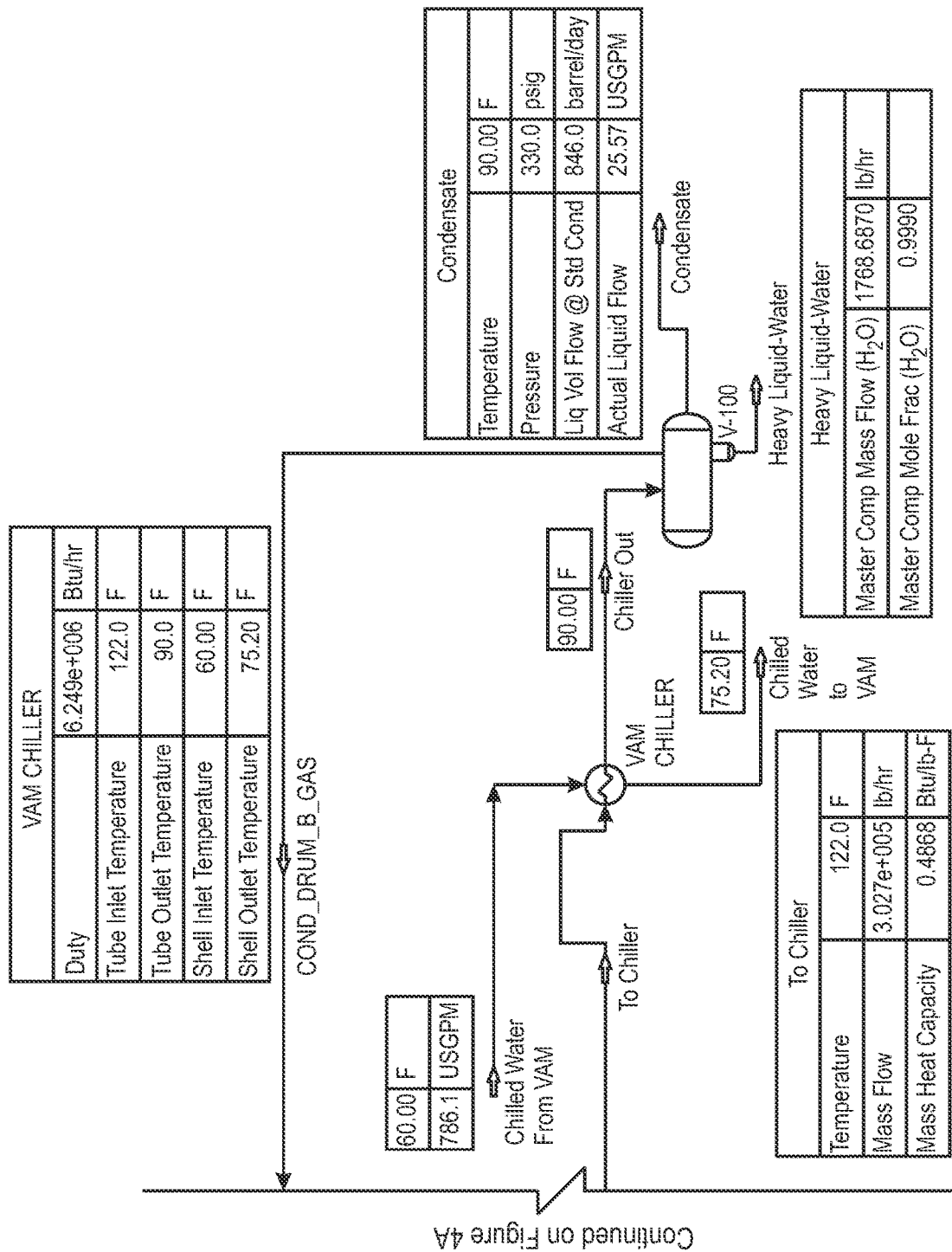

FIGS. 4A and 4B show simulation results where low-grade waste heat was used to generate chilled water for use as a cooling medium for further cooling after the fin-fan coolers. For the simulation, for capturing waste heat from HP compressor discharge stream via the hot water stream connected to the absorption chiller: the hot water flowrate was 997 US gallons per minute (USGPM); the hot water temperature from the absorption chiller was 176° F.; and the hot water temperature to the absorption chiller (after recovering heat from compressor discharge waste heat) was 194° F. For generating chilled water from the absorption chiller: the chilled water flow rate was 786 USGPM; the chilled water temperature from the absorption chiller was 60° F.; the chilled water temperature returning to the absorption chiller was 75.2° F.; the process stream outlet temperature downstream of the chiller heat exchanger (downstream of the fin fan cooler) was 90° F. It was assumed that the absorption chiller allowed the process stream temperature to drop from 122° F. (before absorption chiller) to 90° F.

The additional cooling removed most of the condensable hydrocarbons as well as 50% more water from the gas. The amount of water removed increased by 657 pounds per hour (lb/hr) and the quantity of hydrocarbon condensed increased to 846 barrels per day (bbl/day). The water content of the outgoing gas from the GOSP was reduced from 0.55 mol. % to 0.22 mol. %. The separated water was sent for further processing and the condensate was sent to a stabilization plant along with the crude. On stabilization of 846 bbl/day of condensate at the stabilization plant, the net gain in saleable crude was equal to 472 bbl/day.

What is claimed:

1. A system, comprising:
 a vapor absorption machine, comprising:
  a hot water generator comprising an interior having a fluid disposed therein; and
  a chiller comprising an interior having a fluid disposed therein; and
 a gas oil separation plant (GOSP), comprising:
  a compressor comprising an outlet;
  a reheater comprising:
   a first inlet in fluid communication with the outlet of the compressor;
   a first outlet configured to remove a gas from the GOSP;
   a second inlet; and
   a second outlet;
  a fin fan cooler comprising:
   an inlet in fluid communication with the second outlet of the reheater; and
   an outlet;
  a separator comprising:
   an inlet in fluid communication with the outlet of the fin fan cooler;
   a first outlet in fluid communication with the second inlet of the reheater; and
   a second outlet configured to remove a condensate from the GOSP;
 wherein:
  the vapor absorption machine is configured to decrease a temperature of the fluid in the interior of the chiller using heat from the fluid in the interior of the hot water generator;
  a portion of the fluid in the interior of the hot water generator is in thermal communication with a portion of a fluid disposed between the outlet of the compressor and the first inlet of the reheater; the system is configured so that a temperature of the fluid in the interior of the hot water generator is increased using heat from the fluid in between the outlet of the compressor and the first inlet of the reheater; and
  a portion of the fluid in the interior of the chiller is in thermal communication with a portion of a fluid disposed between the outlet of the fin fan cooler and the inlet of the separator; and the system is configured so that the fluid in the interior of the chiller reduces a temperature of the fluid between the outlet of the fin fan cooler and the inlet of the separator.

2. The system of claim 1, wherein the hot water generator comprises tubes, and the hot water generator is configured so that the fluid disposed in the hot water generator is circulated within the tubes.

3. The system of claim 1, wherein the chiller comprises tubes, and the chiller is configured so that the fluid in the interior of the chiller is circulated within the tubes.

4. The system of claim 1, wherein:
 the GOSP further comprises at least one member selected from the group consisting of a high-pressure production trap and a low-pressure production trap;
 the at least one member comprises an outlet; and
 the compressor comprises an inlet in fluid communication with the outlet of the at least one member.

5. The system of claim 1, wherein the separator further comprises a third outlet configured to remove water from the GOSP.

6. The system of claim 1, wherein:
 the fluid between the outlet of the fin fan cooler and the inlet of the separator comprises a condensable hydrocarbon; and
 the reduction in the temperature of the fluid between the outlet of the fin fan cooler and the inlet of the separator is sufficient to condense at least a portion of the condensable hydrocarbon in the fluid between the outlet of the fin fan cooler and the inlet of the separator.

7. The system of claim 1, wherein:
 the fluid between the outlet of the fin fan cooler and the inlet of the separator comprises water; and
 wherein the reduction in the temperature of the fluid between the outlet of the fin fan cooler and the inlet of the separator is sufficient to condense at least a portion of the water in the fluid between the outlet of the fin fan cooler and the inlet of the separator.

\* \* \* \* \*